(12) United States Patent
Goto et al.

(10) Patent No.: US 7,140,602 B2
(45) Date of Patent: Nov. 28, 2006

(54) FLUID FILLED VIBRATION DAMPING DEVICE

(75) Inventors: Katsuhiro Goto, Inuyama (JP); Hajime Maeno, Kasugai (JP); Koichi Maeda, Nishikamo-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/769,402

(22) Filed: Jan. 30, 2004

(65) Prior Publication Data

US 2004/0183241 A1   Sep. 23, 2004

(30) Foreign Application Priority Data

Jan. 31, 2003   (JP) ............................. 2003-024129

(51) Int. Cl.
*F16F 5/00*   (2006.01)

(52) U.S. Cl. ................... 267/140.13; 267/219

(58) Field of Classification Search ................ 267/118, 267/122, 217, 140.11, 140.12, 140.13, 140.14, 267/140.15, 35, 219; 248/562, 636
See application file for complete search history.

(56) References Cited

U.S. PATENT DOCUMENTS

| | | | | |
|---|---|---|---|---|
| 5,927,698 A | * | 7/1999 | Miyoshi et al. | 267/140.13 |
| 6,250,615 B1 | * | 6/2001 | Leibach | 267/140.13 |
| 6,341,766 B1 | * | 1/2002 | Stiller et al. | 267/140.13 |
| 6,386,527 B1 | * | 5/2002 | Oberle | 267/140.14 |
| 6,517,061 B1 | * | 2/2003 | Yamamoto et al. | 267/140.11 |
| 6,557,839 B1 | * | 5/2003 | Tanaka | 267/140.13 |
| 6,598,865 B1 | * | 7/2003 | Kato | 267/140.13 |
| 2003/0001322 A1 | * | 1/2003 | Goto et al. | 267/140.11 |

FOREIGN PATENT DOCUMENTS

| | | |
|---|---|---|
| JP | 5-60168 | 3/1993 |
| JP | 6-76740 | 10/1994 |
| JP | 2001-59540 | 3/2001 |

* cited by examiner

*Primary Examiner*—Thomas Williams
(74) *Attorney, Agent, or Firm*—Beyer Weaver & Thomas LLP (57) ABSTRACT

A fluid filled vibration damping device including: an elastic body elastically connecting a first and a second mounting member and partially defining a pressure receiving chamber filled with a non-compressible fluid; a flexible diaphragm partially defining an equilibrium chamber filled with the non-compressible fluid and connected to the pressure-receiving chamber via an orifice passage. The first mounting member includes an elastic-body-side central member bonded to the elastic body central portion, and a rubber-layer-side central member bonded to the flexible rubber layer central portion, both mutually superposed on and fastened together by a connecting bolt. A fitting recess and projection are formed at an interface between two members, and a mounting projection projecting outward on an opposite side from the interface. The connecting bolt is off-centered from a center of the two members by a give distance.

6 Claims, 7 Drawing Sheets

FLUID FILLED VIBRATION DAMPING DEVICE

The disclosure of Japanese Patent Application No. 2003-024129 filed on Jan. 31, 2003 including the specification, drawings and abstract is incorporated herein by reference in its entirety.

BACKGROUND OF THE INVENTION

1. Field of the Invention

The present invention relates generally to fluid filled vibration damping devices exhibiting damping effect on the basis of flows of the non-compressible fluid sealed therein, and more particularly to a fluid filled vibration damping device of novel construction, which may be usable as an engine mount or other mounts for use in automotive vehicles.

2. Description of the Related Art

A fluid filled vibration damping device is known as one type of a vibration-damping coupling or mount adapted to be installed between two members of a vibration systems so as to elastically connect or support the two members in a vibration-damping fashion. Citation 1 shows an example of such a fluid filled vibration-damping device, which includes: a rubber elastic body elastically connecting a first and second mounting member fixable to one and the other member mutually connected in a vibration damping fashion, respectively; a pressure receiving chamber partially defined by the rubber elastic body and filled with a non compressible fluid; an equilibrium chamber partially defined by a flexible rubber layer and filled with the non-compressible fluid; and an orifice passage for permitting a fluid communication between the pressure-receiving chamber and the equilibrium chamber. Upon application of a vibrational load between the first and second mounting members, the fluid is forced to flow through the orifice passage between the pressure receiving chamber and the equilibrium chamber, so that the fluid filled vibration damping device can exhibit damping effect on the basis of resonance or flows of the fluid flowing through the orifice passage. In the fluid filled vibration damping device of this structure, the pressure receiving chamber and the equilibrium chamber are disposed on the opposite sides of the elastic body, making it possible to decrease a dimension of the device in the vertical or height direction. For the above-described advantage, the conventional fluid filled vibration damping device may be effectively usable as an automotive engine mount that is prone to be requested to be installed in a limited space.

[Citation]

JP-A-2001-59540

In the conventional vibration damping device, as indicated in Citation 1, the first mounting member is bonded to a central portion of the elastic body, and the second mounting member is bonded to an outer circumferential portion of the elastic body, while the flexible rubber layer is disposed surrounding and covering an outside of the rubber elastic body. The flexible rubber layer is bonded at its central portion to the first mounting member, and at its outer peripheral portion to the second mounting member. Typically, the elastic body and the flexible rubber layer are formed separately, since it is difficult to form the elastic body and the flexible rubber layer integrally due to their different requested characteristics, limitations comes from mold structures, or the like. For this reason, the first mounting member is composed of an elastic-body-side central member and a rubber-layer-side central member, and the elastic body and the flexible rubber layer are formed separately such that the elastic body is bonded at its central portion to the elastic-body-side central member, while the flexible rubber layer is bonded at its central portion to the rubber-layer-side central member. The elastic-body-side central member and the rubber-layer-side central member are superposed on each other and connected together by means of a connecting bolt, thereby providing the first mounting member.

However, the conventional fluid-filled vibration damping device of the aforesaid structure has still suffered from the following problems (1)–(3) upon fastening the two separate members (i.e., the elastic-body-side central member and the rubber-layer-side central member) together by means of the connecting bolt to provide the first mounting member.

(1) One problem is a difficulty in producing a reaction force against a tightening torque from the connecting bolt. That is, since the elastic-body-side central member is covered by the rubber-layer-side central member, it is impossible to directly hold the elastic-body-side central member in order to produce the reaction force against the tightening torque from the connecting bolt.

(2) Another problem is a low degree of freedom in designing a mounting portion of the first mounting member, which portion is utilized to fix the first mounting member to the one of the two members connected together in a vibration damping fashion. Namely, the connecting bolt is situated on a central portion of a surface of the rubber-layer-side central member, making it difficult to integrally form the mounting portion of desired configuration on the rubber-layer-side central member in view of a space. To form such a mounting portion, unavoidable is an enlargement of the rubber-layer-side central member. The citation 1 discloses a conventional structure in which the mounting portion is formed by utilizing the connecting bolt. However, it is apparent that the conventional structure is not adapted sufficiently for a variety of structures or shapes of members to which the first mounting member is fixed.

(3) A further problem is that when fastening the elastic-body-side central member and the rubber-layer-side central member together by means of the connecting bolt, mutually aligned bolt holes of these members are prone to be dislocated from each other during insertion the connecting bolt into these bolt holes, making it cumbersome to assemble these members. Namely, the elastic-body-side central member and the rubber-layer-side central member are prone to be dislocated from each other at their abutting surfaces, making it difficult to align the bolt holes of these members to each other, and to hold these member in a mutually aligned state.

It may be proposed to fasten the elastic-body-side central member and the rubber-layer-side central member together by caulking or other appropriate methods, without using the mounting bolt. However, a caulking operation needs a specific device, undesirably pushing a manufacturing cost up. In the case where the elastic-body-side central member and the rubber-layer-side central member are formed of aluminum alloy, the caulking operation may not be employable in view of insufficient strength and durability of the members.

SUMMARY OF THE INVENTION

It is therefore one object of this invention to provide a fluid filled vibration damping device of novel construction, which is capable of readily fastening an elastic-body-side central member and a rubber-layer-side central member together by means of a connecting bolt to provide a first mounting member, which is capable of integrally forming, on the rubber-layer-side central member with high degree of freedom, a mounting member fixable to one of two members to be connected in a vibration damping fashion, and which is capable of solving all of the aforementioned problems (1)–(3) experienced in a conventional device.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of this invention provides a fluid filled vibration damping device for connecting two members in a vibration damping fashion, including: a first mounting member fixable to one of the two members; a second mounting member fixable to an other of the two members; an elastic body bonded at a central portion thereof to the first mounting member and at an outer circumferential portion to the second mounting member, for elastically connecting the first and second mounting members, said elastic body partially defining a pressure receiving chamber filled with a non-compressible fluid and undergoing fluid pressure variation upon application of vibrational load between the first and second mounting members; a flexible rubber layer disposed about and covering an outside of the elastic body opposite the pressure receiving chamber, in order to define therebetween an equilibrium chamber filled with the non-compressible fluid and partially defined by the flexible rubber layer so as to easily permits a volumetric change thereof; and an orifice passage for fluid communication between the pressure receiving chamber and the equilibrium chamber, wherein the first mounting member includes an elastic-body-side central member bonded to the central portion of the elastic body, and a rubber-layer-side central member bonded to a central portion of the flexible rubber layer, which are superposed on and fastened to each other by means of a connecting bolt, wherein a projection/recess fitting portion is provided at a central portion of an interface between the elastic-body-side central member and the rubber-layer-side central member, and wherein the rubber-layer-side central member includes a mounting projection projecting outward on an opposite side from the interface so that the first mounting member is fixable to the one of the two members at the mounting projection, and the connecting bolt is situated off-centered from a center of the rubber-layer-side central member and the elastic-body-side central member by a predetermined distance.

In a fluid filled vibration damping device constructed according to the first mode of the invention, the connecting bolt for fastening the elastic-body-side central member and the rubber-layer-side central member, is situated off-centered from the center of these members. This arrangement makes it possible to form the mounting projection at a portion spaced away from the connecting bolt, and near to the center of the elastic-body-side central member, thus preventing or minimizing enlargement of the rubber-layer-side central member, while enhancing a degree of freedom in design choice of the mounting projection.

In addition, the elastic-body-side central member and the rubber-layer-side central member are fitted together at the interface therebetween by means of the projection/recess fitting portion, facilitating positioning of these two members to each other, while facilitating fastening of these members by means of the mounting bolt. Moreover, the connecting bolt is situated off-centered from the projection/recess fitting portion that are formed on the central portion of the elastic-body-side member and the rubber-layer-side central member, making it possible to transmit and apply a reaction force against a fastening torque from the connecting bolt to the elastic-body-side central member from the rubber-layer-side central member, via the partition/recess fitting portion. Accordingly, by simply fastening the connecting bolt into the two central members with the mounting projection fixedly supported, the connecting bolt can be firmly fastened with excellent operability, without needing a direct fastening of the elastic-body-side central member.

A second mode of the invention provides a fluid filled vibration damping device according to the first mode, wherein the mounting projection and the connecting bolt are off-centered in mutually opposite directions from the center of the rubber-layer-side central member and the elastic-body-side central member. This arrangement makes it possible to arrange the mounting projection and the connecting bolt on the surface of the rubber-layer-side central member, with effective space utilization, thus enhancing a degree of freedom in designing the mounting projection, while making the rubber-layer-side central member contact in size in a further efficient manner.

A third mode of the present invention provides a fluid filled vibration damping device according to the first or second mode, wherein the elastic-body-side central member and the rubber-layer-side central member are both made of aluminum alloy. This arrangement makes it possible to ensure a sufficient fastening strength between the elastic-body-side central member and the rubber-layer-side central member with the help of fastening structure of the invention using the connecting bolt, while reducing the weight of the central members by employing aluminum alloy members.

A fourth mode of the present invention provides a fluid filled vibration damping device according to any one of the first through third modes of the invention, wherein the projection/recess fitting portion is of non-circular configuration in transverse cross section that a relative rotation between the elastic-body-side central member and the rubber-layer-side central member is prevented. The use of the projection/recess fitting portion of non-circular configuration, is able to prevent a relative rotation between the elastic-body-side central member and the rubber-layer-side central member in the circumferential direction, and to position these member relative to each other in the circumferential direction, in addition to prevent a relative displacement between these members at their abutting surfaces. This makes it possible to produce a reaction force against the fastening torque upon fastening the connecting bolt, in a strong manner.

A fifth mode of the present invention provides a fluid filled vibration damping device according to any one of the first through fourth modes of the invention, wherein the second mounting member includes an elastic-body-side outer circumferential member bonded to the outer circumferential portion of the elastic body, and a rubber-layer-side outer circumferential member bonded to an outer circumferential portion of the flexible rubber layer, which are superposed on and fixed to each other at respective abutting surfaces thereof, and the orifice passage is formed by utilizing the abutting surfaces of the elastic-body-side outer circumferential member and the rubber-layer-side outer circumferential member. In this mode, the orifice member is formed by utilizing the members composing the second mounting member, making it possible to embody the orifice passage with a simple structure and with a reduced number of components, thereby simplifying manufacturing steps of the fluid-filled vibration damping device, and minimizing a manufacturing cost. With this regards, the elastic-body-side outer circumferential member and the rubber-layer-side outer circumferential member may be effectively formed by utilizing metallic or synthetic resin products having a circumferential wall portion or a tubular wall portion partially defining the orifice passage.

BRIEF DESCRIPTION OF THE DRAWINGS

The forgoing and/or other objects, features, and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
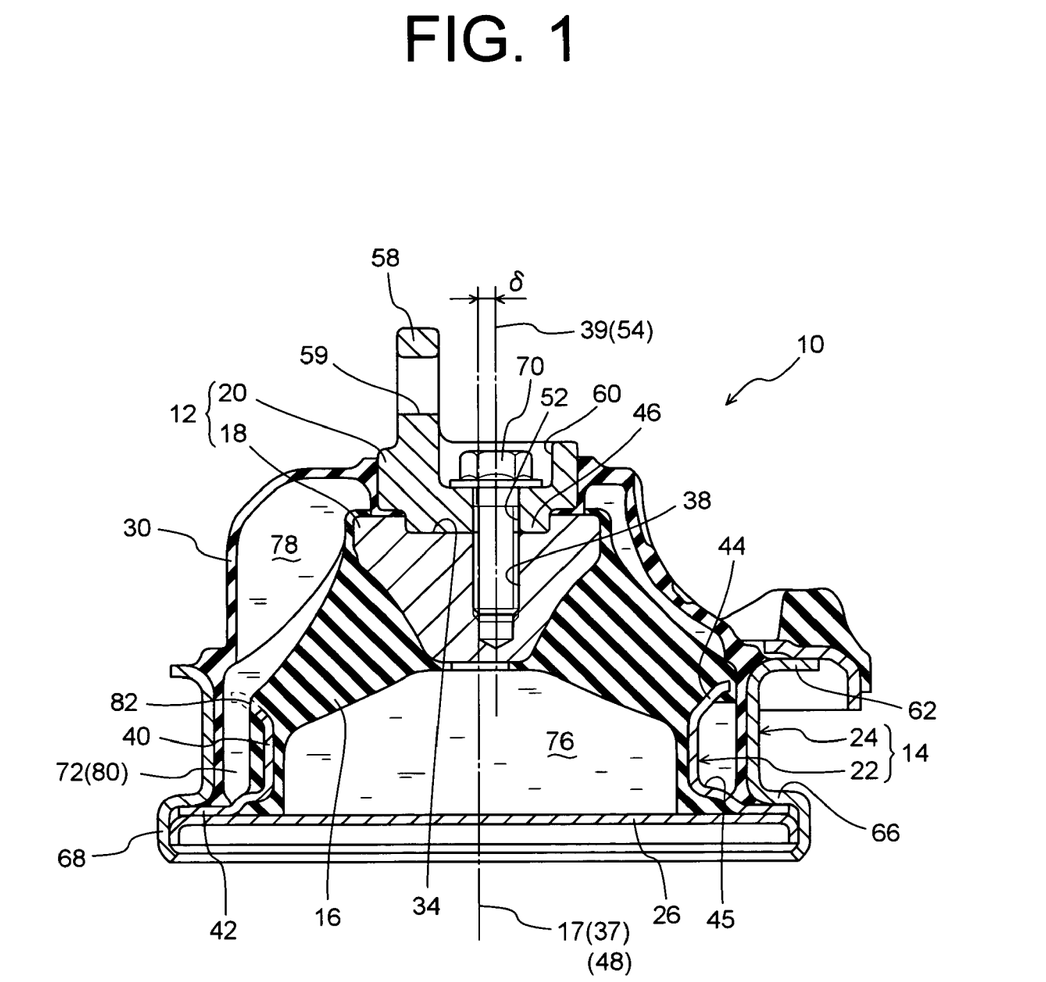
FIG. 1 is an elevational view in axial or vertical cross section of a fluid filled vibration damping device in the form of an engine mount for use in an automotive vehicle, which is constructed according to one preferred embodiment of the invention, and which corresponds to a cross sectional view taken along line 1—1 of FIG. 3.
Figure 2:
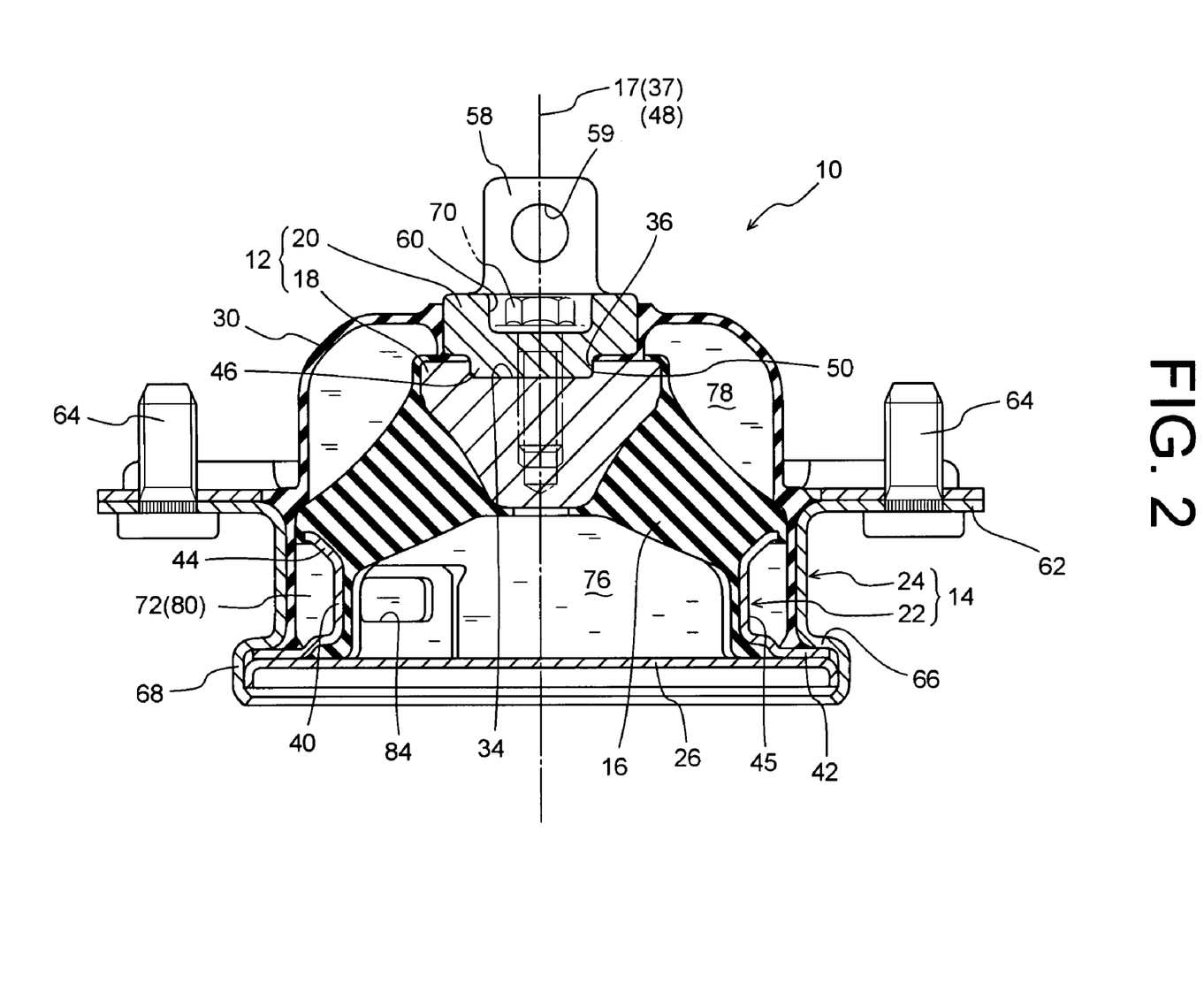
FIG. 2 is an elevational view in axial or vertical cross section of the engine mount of FIG. 1, corresponding to a cross sectional view taken along line 2—2 of FIG. 3.

Referring first to FIGS. 1–2, shown is a fluid filled vibration damping device in the form of an engine mount 10 constructed according to a first embodiment of the present invention. The engine mount 10 includes a first mounting member 12 and a second mounting member 14 which are both made of metal, and are elastically connected to each other via a rubber elastic body 16 interposed therebetween. With the first mounting member 12 fixed to a power unit (not shown) of the vehicle, and the second mounting member 14 fixed to a body (not shown) of the vehicle, the engine mount 10 can support the power unit on the body of the vehicle in a vibration damping fashion. With the engine mount 10 installed in position as described above, an initial load or weight of the power unit as well as a vibrational load to be damped are primarily applied between the first and second mounting members 12, 14 in an approximately axial direction of the engine mount 10, i.e., the vertical direction as seen in FIG. 1. In the following description, the vertical direction is basically equal to the vertical direction as seen in FIG. 1.

Figure 3:
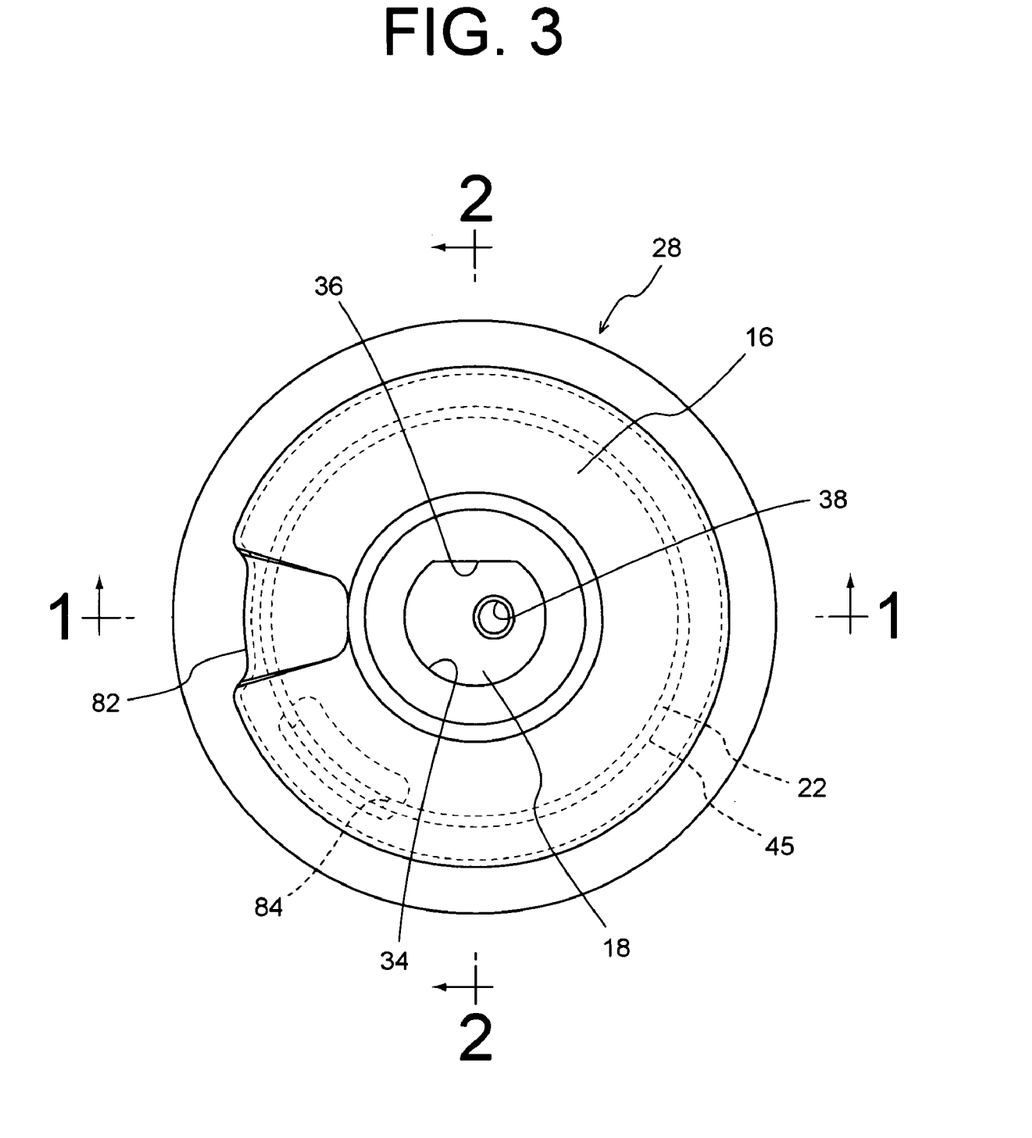
FIG. 3 is a top plane view of a first integral vulcanization product of the engine mount of FIG. 1.
Figure 4:
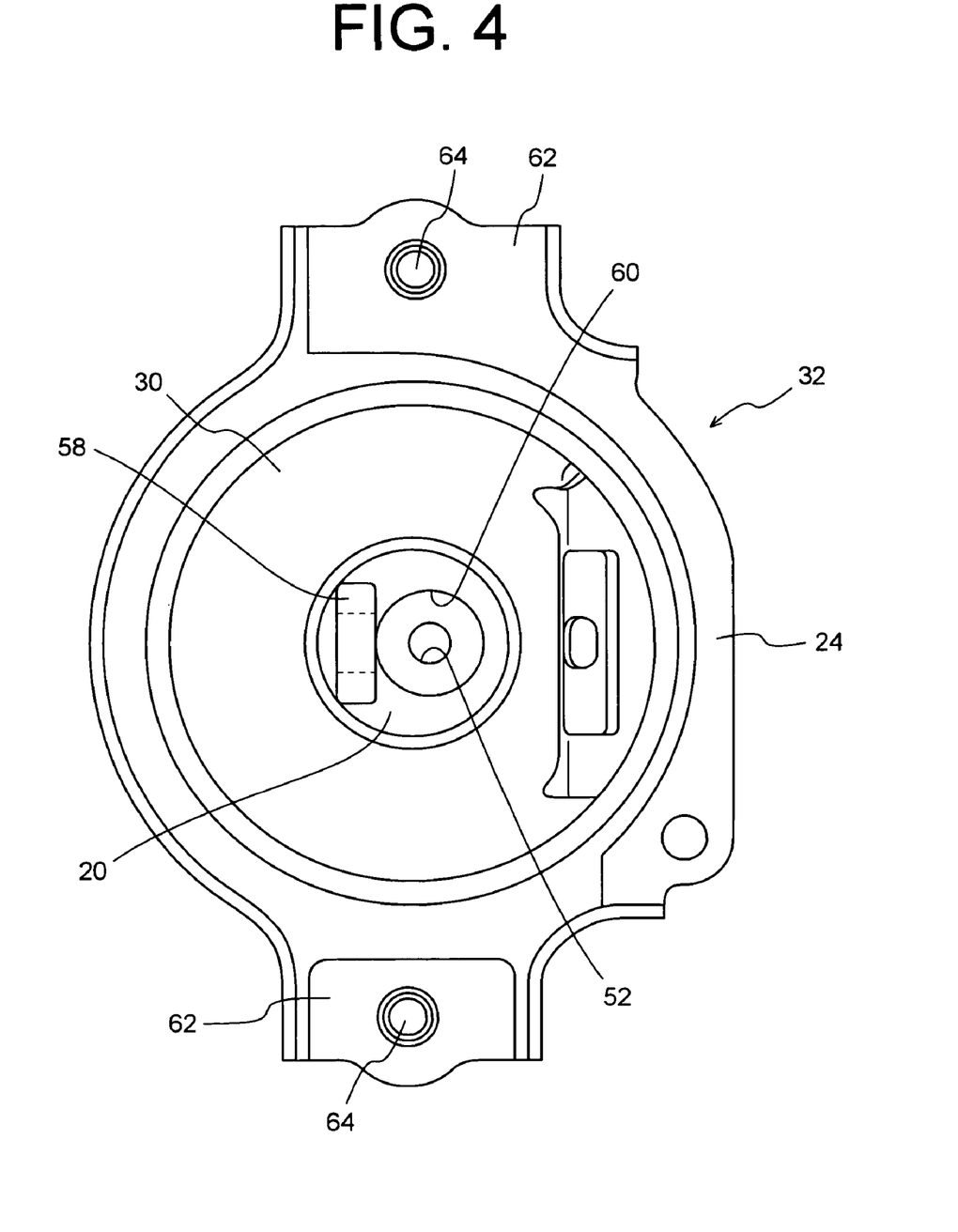
FIG. 4 is a top plane view of a second integral vulcanization product of the engine mount of FIG. 1.

The first mounting member 12 includes an elastic-body-side inner member 18 functioning as an elastic-body-side central member and a diaphragm-side inner member 20 functioning as a rubber-layer-side central member. On the other hand, the second mounting member 14 includes an elastic-body-side outer sleeve member 22 functioning as an elastic-body-side outer circumferential member and a diaphragm-side outer sleeve member 24 functioning as a rubber layer-side outer circumferential member. The elastic-body-side inner member 18 and the elastic-body-side outer sleeve member 22 are bonded to the elastic body 16 by an integral vulcanization molding of a rubber material with the two members 18, 22, thereby providing a first integral vulcanization product 28 (see FIG. 3). Likewise, the diaphragm-side inner member 20 and the diaphragm-side outer sleeve member 24 are bonded to a flexible diaphragm 30 functioning as a flexible rubber layer by integral vulcanization molding of a rubber material with the two members 20, 24, thereby providing a second integral vulcanization product 32 (see FIGS. 4 and 5). These first and second integral vulcanization products 28, 32 are mutually assembled.

Described in detail, the elastic-body-side inner member 18 of the first integral vulcanization product 28 has an approximately inverted truncated conical shape in its entirety. An upper end face (large diameter end face) of the elastic-body-side inner member 18 has a fitting recess 34 open therein. As is apparent from FIGS. 1–3, the fitting recess 34 has a chord shaped portion at a circumferential position thereof to provide an engaging inner circumferential surface 36.

The elastic-body-side inner member 18 is further formed with a tapped hole 38 open in a bottom face of the fitting recess 34. A center axis 39 of the tapped hole 38 is off-centered by a predetermined distance 6 from the center of the fitting recess 34, thereby extending parallel to a center axis 37 of the elastic-body-side inner member 18. Preferably, the elastic-body-side inner member 18 is formed of an aluminum alloy, which is lighter than steel or the like, and easy to mold.

The elastic-body-side outer sleeve member 22 includes a cylindrical wall portion 40 of substantially large-diameter cylindrical configuration, and a flange portion 42 integrally formed at an axially lower end portion of the cylindrical wall portion 40, and extending diametrically outwardly. An axially upper end portion of the cylindrical wall portion 40 provides a tapered cylindrical portion 44 whose diameter gradually increases as its goes axially upward. The elastic-body-side outer sleeve member 22 of this configuration provides a circumferential groove 45 open in an outer circumferential surface thereof and extending circumferentially with a circumferential length slightly smaller than a circumference thereof. The elastic-body-side inner member 18 is disposed upward of and concentrically with the elastic-body-side outer sleeve member 22 with an axial spacing therebetween, such that an outer circumferential surface of tapered configuration of the elastic-body-side inner sleeve member 18 and an inner circumferential surface of the tapered cylindrical portion 44 of the elastic-body-side outer sleeve member 22 are mutually opposed to each other with a spacing therebetween. The elastic body 16 is disposed in between and elastically connecting the outer circumferential surface of the elastic-body-side inner member 18 and the inner circumferential surface of the tapered cylindrical portion 14.

The elastic body 16 has a large-diameter truncated conical shape in its entirety. In a small diameter or central portion of the elastic body 16, the elastic-body-side inner member 18 is embedded in a coaxial relationship with the elastic body 16, by the aforesaid integral vulcanization molding. In a large diameter portion of the elastic body 16, the tapered cylindrical portion 44 of the elastic-body-side outer sleeve member 22 is bonded to an outer circumferential surface of the elastic body 16 by the aforesaid integral vulcanization molding. Thus, the elastic body 16 is equipped with the elastic-body-side inner member 18 and the elastic-body-side outer sleeve member 22, providing the first integral vulcanization product 28.

Figure 5:
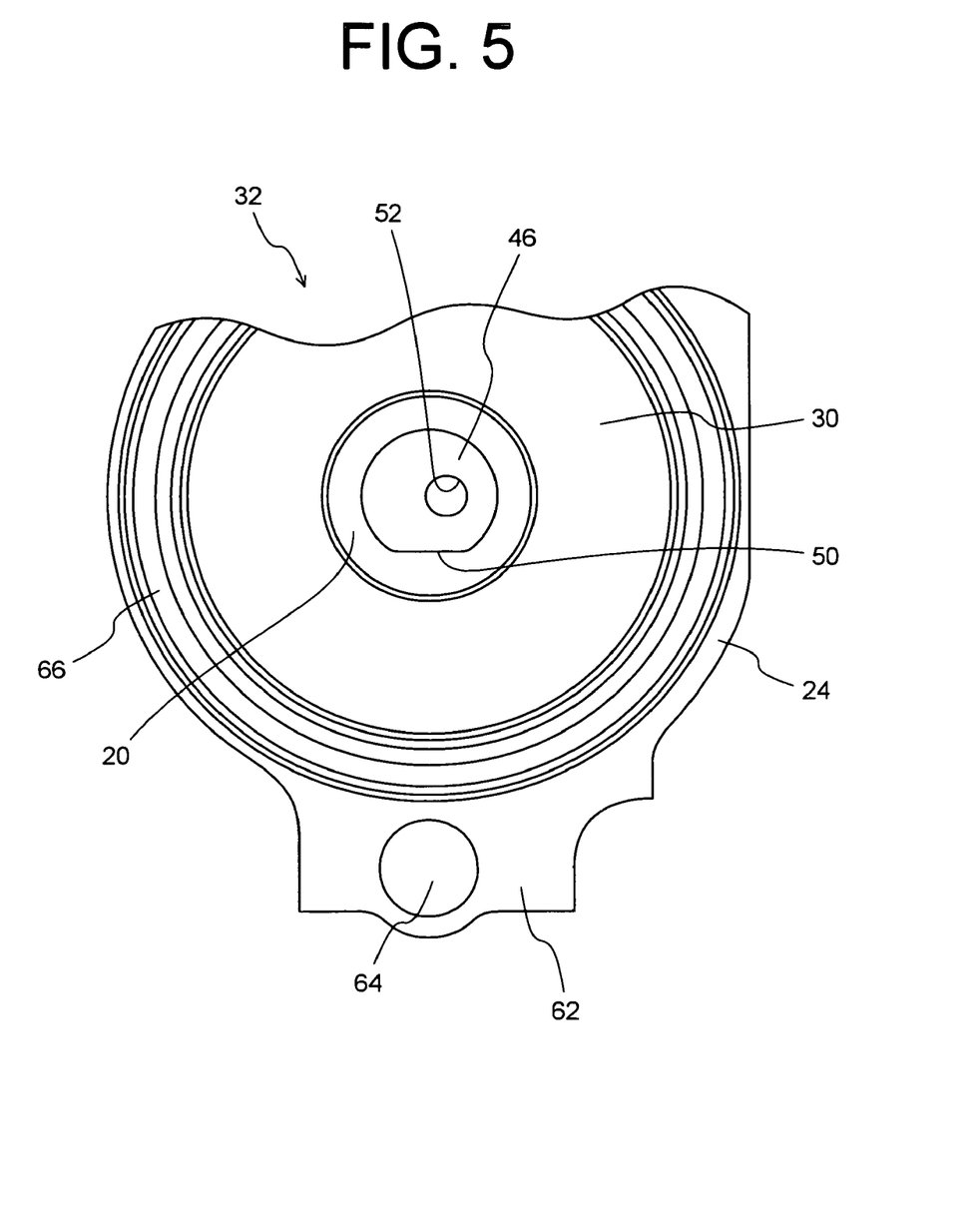
FIG. 5 is a fragmental bottom plane view of the second integral vulcanization product of FIG. 4.

On the other hand, the diaphragm-side inner member 20 of the second integral vulcanization product 32 has a thick-walled disk shape. In the present embodiment, the diaphragm-side inner member 20 measures an outside diameter slightly smaller than does the elastic-body-side inner member 18, and has a fitting projection 46 projecting outward from its lower face, with a configuration corresponding to that of the fitting recess 34. Namely, as shown in FIGS. 1, 2 and 5, the fitting projection 46 projects with a substantially constant height and constant transverse cross section of generally circular shape. A center axis of the fitting projection 46 is conform with a center axis 48 of the diaphragm-side inner member 20. Like the fitting recess 34, the fitting projection 46 has a chord shaped portion at a circumferential portion thereof to provide an engaging outer circumferential surface 50.

The diaphragm-side inner member 20 is further formed with a through hole 52 extending through the fitting projection 46 in its axial direction. A center axis 54 of the through hole 52 is off-centered by a predetermined distance 6 from the center of the fitting projection 46, thereby extending parallel to the center axis 48 of the diaphragm-side inner member 20. In should be noted that the distance δ between both centers of the through hole 52 and the fitting projection 46 is made equal to the distance δ between both centers of the tapped hole 38 and the fitting recess 34 of the elastic-body-side inner member 18. This arrangement makes it possible to place the through hole 52 and the tapped hole 38 in a coaxial relationship with each other, when the diaphragm-side inner member 20 and the elastic-body-side inner member 18 are superposed on each other in the axial direction with the fitting projection 46 press-fit into the fitting recess 34. It should be appreciated that the fitting projection 46 and the fitting recess 34 cooperate to provide a projection/recess fitting portion in the present embodiment.

The diaphragm-side inner member 20 further includes an integrally formed mounting projection in the form of a mounting plate portion 58 projecting outward from its upper face, and functioning as a mounting projection. The mounting plate portion 58 is of a rectangular plate configuration, and has a bolt hole 59 extending through its central portion. The mounting plate portion 58 is situated offset from the center axis 48 of the diaphragm-side inner member 20 in a direction diametrically opposite to a direction in which the center axis 54 of the through hole 52 is off-centered from the center axis 48. In other words, the center axis 54 of the through hole 52 and the mounting plate portion 58 are opposed to each other in the diametric direction with the center axis 48 of the diaphragm-side inner member 20 interposed therebetween.

The diaphragm-side inner member 20 has a bolt head housing recess 60 open in its upper end face and disposed in coaxial relationship with the through hole 52. The bolt head housing recess 60 has a diameter so as not to reach the mounting plate portion 58. Preferably, the diaphragm-side inner member 20 is formed of an aluminum alloy, which is lighter than steel or the like and easy to mold.

The diaphragm-side outer sleeve member 24 has a thick-walled large-diameter cylindrical shape in its entirety, and has a mounting plate portion 62 integrally formed at its axially upper open end portion extending diametrically outwardly. The mounting plate portion 62 has a plurality of through holes into which fixing bolts 64 secured press fit, respectively. The diaphragm-side outer sleeve member 24 also has a flange portion 66 integrally formed at its axially lower open-end portion extending diametrically outwardly. Integrally formed at an outer peripheral edge of the flange portion 66 is an annular caulking lip 68 projecting axially downward.

The diaphragm-side inner member 20 is disposed upward of and concentrically with the diaphragm-side outer sleeve member 24 with an axial spacing therebetween, and is elastically connected with the diaphragm-side outer sleeve member 24 by the flexible diaphragm 30.

The flexible diaphragm, 30 is a thin rubber layer of approximately annular configuration, and extends circumferentially with a curve cross section as to provide a large slack to permit an easy elastic deformation thereof. An inner peripheral edge of the flexible diaphragm 30 is bonded to an outer peripheral edge of the diaphragm-side inner member 20 by the aforesaid integral vulcanization molding, and an outer peripheral edge of the flexible diaphragm 30 is bonded to the axially upper open end portion of the diaphragm-side outer sleeve member 24 by the afore said integral vulcanization molding. Thus, the flexible diaphragm 30 is equipped with the diaphragm-side inner member 20 and the diaphragm-side outer sleeve member 24, providing the second integral vulcanization product 32.

The second integral vulcanization product 32 is superposed on and assembled with the first integral vulcanization product 28 such that the diaphragm-side inner member 20 is fixed to the elastic-body-side inner member 18, while the diaphragm-side outer sleeve member 24 is fixed to the elastic-body-side outer sleeve member 22. With the first and second vulcanization products 28, 32 assembled together, the flexible diaphragm 30 is situated outward of the elastic body 16 with a spacing therebetween, while covering an entire outer circumferential surface of the elastic body 16.

Namely, the diaphragm-side inner member 20 is directly superposed on the upper surface of the elastic-body-side inner member 18 with its fitting projection 46 secured press fit into the fitting recess 34 of the elastic-body-side inner member 18. With this mating state, the diaphragm-side inner member 20 and the elastic-body-side inner member 18 are mutually positioned in a coaxial fashion. In particular, the engaging outer circumferential surface 50 formed on the fitting projection 46 is brought into engagement with the engaging inner circumferential surface 36 of the fitting recess 34, whereby the diaphragm-side inner member 20 and the elastic body-side inner member 18 are mutually positioned in a circumferential direction as well. Thus, the through hole 52 of the diaphragm-side inner member 20 and the tapped hole 38 of the elastic-body-side inner member 18 are in alignment with each other.

With the elastic-body-side inner member 18 and the diaphragm-side inner member 20 assembled with each other as shown in FIGS. 1 and 2, a connecting bolt 70 is inserted through the through hole 52 and threaded and tightened into the tapped hole 38. By connecting the elastic-body-side inner member 18 and the diaphragm-side inner member 20 together by means of the connecting bolt 70, is provided the first mounting member 12.

When connecting the elastic-body-side inner member 18 and the diaphragm-side inner member 20 together by means of the connecting bolt 70, these two members 18, 20 can be easily positioned relative to each other with the help of a positioning function of engagement between the engaging inner circumferential surface 36 and the engaging outer circumferential surface 50, thus making it possible to place the tapped hole 38 and the through hole 52 in a mutually aligned state. Thus, the mounting bolt 70 can be easily fitted into the elastic-body-side inner member 18 and the diaphragm-side inner member 20.

Since the through hole 52 and the tapped hole 38 for receiving the connecting bolt 70 are off-centered from or eccentric to the fitting projection 46 and the fitting recess 34, a mutual displacement in the circumferential direction between the elastic-body-side inner member 18 and the diaphragm-side inner member 20 is prevented with the inner circumferential surface of the through hole 52 brought into abutting contact with the mounting bolt 70 threaded engaged with the tapped hole 38. Namely, when tightening the connecting bolt 70 into the tapped hole 38, a reaction force against a tightening torque from the connecting nut 70 is exerted on the elastic-body-side inner member 18 about the center axis 39 of the tapped hole 38. With this state, the mutual displacements between the elastic-body-side inner member 18 and the diaphragm-side inner member 20 about the center axis 39 of the tapped hole 38 can be effectively prevented by means of the engagement between the inner circumferential surface 36 and the engaging outer circumferential surface 50, as well as the abutment contact of the inner circumferential surface of the through hole 52 against the connecting bolt 70 threaded engaged with the tapped hole 38. As a result, a reaction force against the tightening torque is directly applied to the diaphragm-side inner member 20 via the elastic-body-side inner member 18.

Accordingly, when tightening the connecting bolt 70 into the tapped hole 38, a fixation force can be applied to the elastic-body-side inner member 18 via the diaphragm-side inner member 20, by applying the fixation force to the diaphragm-side inner member 20 exposed to the outside, without directly applying the fixation force to the elastic-body-side inner member 18 embedded within the elastic body 16. This makes it possible to burden the reaction force against the tightening torque with the elastic-body-side inner member 18. Since the diaphragm-side inner member 20 has the mounting plate portion 58 integrally formed thereon and projecting outwardly therefrom, a fixation force can be effectively generated by utilizing this mounting plate portion 58, further facilitating a tightening operation of the mounting bolt 70 with a sufficient tightening force.

On the other hand, the diaphragm-side outer sleeve member 24 is assembled from the axially upper side with the elastic-body-side outer sleeve member 22, so as to be disposed about the elastic-body-side outer sleeve member 22. At the lower side of the elastic-body-side outer sleeve member 22, the flange portion 42 is held in contact at its peripheral portion with the flange portion 66 of the diaphragm-side outer sleeve member 24 in the axial direction. At the upper side, an open peripheral portion of the tapered cylindrical portion 44 is held against an inner circumferential surface of the diaphragm-side outer sleeve member 24 in the diametric direction. With this mating state, the caulking lip 68 of the diaphragm-side outer sleeve member 24 is caulked against the peripheral portion of the flange portion 42 of the elastic-body-side outer sleeve member 22, whereby the elastic-body-side outer sleeve member 22 and the diaphragm-side outer sleeve member 24 are mutually fastened together. In addition, the upper and lower end of the elastic-body-side outer sleeve member 22 are held against the diaphragm-side outer sleeve member 24 with sealing rubber layers integrally formed with the elastic body 16 and the flexible diaphragm 30 compressed therebetween, respectively, so as to provide a fluid-tight sealing therebetween.

With the elastic-body-side outer sleeve member 22 assembled with the diaphragm-side outer sleeve member 24 as described above, the opening of the circumferential groove 45 is fluid-tightly closed by the diaphragm-side outer sleeve member 24. Thus, there is formed an annular fluid passage 72 continuously extending in the circumferential direction between the cylindrical wall portion 40 of the elastic-body-side outer sleeve member 22 and the diaphragm-side outer sleeve member 24, with a given circumferential length, or over an entire circumference of the cylindrical wall portion 40. On the lower side of the elastic-body-side outer cylindrical member 22, is disposed a large diameter disk shaped lid member 26 of metal that is held in contact with the lower end faces of the elastic body 16 and the flange portion 42 of the elastic-body-side outer sleeve member 22. An peripheral edge portion of the lid member 26 is fixed, together with the flange portion 42 of the elastic-body-side outer sleeve member 22, against to the flange portion 66 of the diaphragm-side outer sleeve member 24 by caulking the caulking lip 68 against the lid member 26. With this arrangement, an axially lower open-end portion of the elastic-body-side outer sleeve member 22 is fluid-tightly closed by the lid member 26. A fluid-tight sealing at an interface between the elastic-body-side outer sleeve member 22 and the lid member 26 is provided by means of a sealing rubber integrally formed with the elastic body 16, and interposed therebetween.

The thus mutually assembled diaphragm-side outer sleeve member 24, the elastic-body-side outer sleeve member 22, and the lid member 26 are fastened together by caulking, to thereby provide the second mounting member 14 that is elastically connected to the first mounting member 12 via the elastic body 16.

With the lower open end of the second mounting member 14 fluid-tightly closed with the lid member 26, a pressure-receiving chamber 76 filled with a non-compressible fluid is formed between the elastic body 16 and the lid member 26. The pressure-receiving chamber 76 is partially defined by the elastic body 16, and undergoes fluid pressure variation due to elastic deformation of the elastic body 16 during input of vibrational load between the first mounting member 12 and the second mounting member 14.

Further, with the elastic body 16 and the fixable diaphragm 30 are bonded to the first and second mounting members 12, 14 at their inner circumferential edge portions and outer circumferential edge portions, respectively, an equilibrium chamber 78 filled with the non-compressible fluid is formed between the elastic body 16 and the flexible diaphragm 30. Namely, the equilibrium chamber 78 is partially defined by the flexible diaphragm 30 readily deformable, so as to permit its volumetric change on the basis of elastic deformation of the flexible diaphragm 30. Generally, a non-compressible fluid filling the pressure-receiving chamber 76 and the equilibrium chamber 78 is preferably a low viscous fluid whose viscosity is 0.1 Pa.s or lower, for permitting the engine mount 10 to exhibit a high damping effect at a required frequency range on the basis of resonance of the non-compressible fluid flowing through an orifice passage 80 that will be described later.

The aforesaid annular fluid passage 72 formed within the second mounting member 14, is connected at its opposite ends to the pressure receiving chamber 76 on the lower side of the elastic body 16 and equilibrium chamber 78 on the upper side of the elastic body 16 through communication holes 82, 84, thereby providing an orifice passage 80 with a given length for permitting, which permits a fluid communication between the pressure receiving chamber 76 and the equilibrium chamber 78. As well known in the art, the fluid is forced to flow through the orifice passage 80 on the basis of relative fluid pressure variation caused between the pressure receiving chamber 76 and the equilibrium chamber 78 during input of vibrational load. Thus, the engine mount 10 can exhibit excellent damping effect with respect to the input vibrational load on the basis of resonance of the fluid flowing through the orifice passage 80. The damping performance of the engine mount 10 on the basis of the flows of the fluid through the orifice passage 80 can be adjusted in terms of a frequency characteristic, by only tuning a ratio of the cross sectional area to the length of the orifice passage 80.

The engine mount 10 of construction as discussed above is installed between a power unit and body of the vehicle (not shown) such that the mounting plate portion 58 of the first mounting member 12 is superposed on and fixed to the power unit of the vehicle, via a suitable bracket as needed, and the mounting plate portion 62 of the second mounting member 14 is superposed on and fastened by means of the mounting bolt to the body, via a suitable bracket as needed. Thus, the engine mount 10 can elastically mount the power unit on the body in a vibration isolation fashion.

With the engine mount 10 installed in position as described above, the engine mount 10 can exhibit vibration damping effect on the basis of resonance of the fluid flowing through the orifice passage 80 due to mutual fluid pressure variation between the pressure receiving chamber 76 and the equilibrium chamber 78, with respect to vibrational applied between the first and second mounting members 12, 14.

In the engine mount 10 constructed according to the present embodiment, the mounting plate portion 58 of the first mounting member 12 can be formed with a desired shape and size in a sufficiently high degree of freedom, thus making it possible to readily adapt the shape of the mounting plate portion 58 to a configuration or structure of a fixing portion on the power unit to which the first mounting member 12 is fixed.

Moreover, in the diaphragm-side inner member 20 formed with the mounting plate portion 58, the through hole 52 is off-centered from the center axis of the member 20. This arrangement can provide a relatively wide space on the opposite side from the area where the through hole 52 is off-centered, and the mounting plate portion 58 is integrally formed on this wide space. Thus, the mounting plate portion 58 can be formed with a sufficient size and strength, while avoiding enlargement in size of the diaphragm member 20 and the first mounting member 12.

When connecting the elastic-body side inner member 18 and the diaphragm-side inner member 20 together by fastening the connecting bolt 70 into the tapped hole 38, it is possible to apply the reaction force against the fastening torque to the elastic-body-side inner member 18 without acting an external force directly on the elastic-body-side inner member 18, by only holding or fixedly supporting the mounting plate portion 58 projecting from the diaphragm-side inner member 20. Therefore, the connecting bolt 70 can be easily and firmly fastened with a simple operation.

While the presently preferred embodiment of this invention has been described in detail for the illustrative purpose only, it is to be understood that the present invention is not limited to the details of the illustrated embodiment. It is also to be understood that the present invention may be embodied with various changes, modifications and improvements which may occur to those skilled in the art, without departing from the spirit and scope of the invention.

For instance, the shape and size of a mounting projection integrally formed on the diaphragm-side inner member 20 can be suitably determined depending on a shape and structure of a fixing area of the power unit to which the first mounting member 12 is fixed, but not limited to those of the mounting plate portion 58 in the illustrated embodiment.

The orifice passage 80 for a fluid communication between the pressure receiving chamber 76 and the equilibrium chamber 78, may have a variety of configurations and structures, depending on required damping characteristics or the like. For instance, by installing a separately formed orifice member into an engine mount, it become possible to provide an orifice passage extending circumferentially with a circumferential length larger than a circumference of the engine mount.

Figure 6:
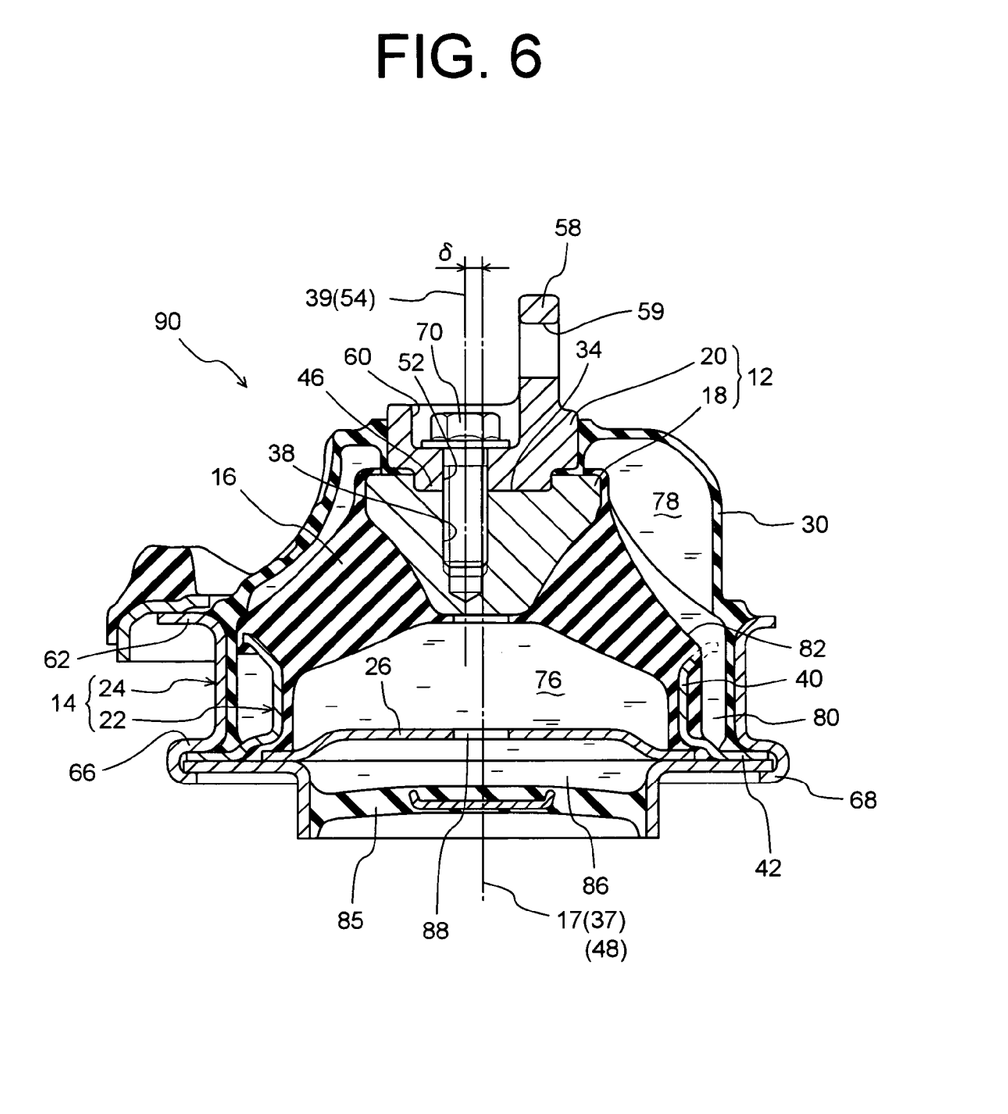
FIG. 6 is a vertical cross sectional view of a fluid filled vibration damping device in the form of an engine mount for use in an automotive vehicle, which is constructed according to a second embodiment of the present invention, and corresponding to the view of FIG. 1.

The illustrated engine mount 10 may desirably incorporate a variety of known mechanism or devices, depending on required vibration damping characteristics. For instance, an auxiliary fluid chamber 86 may be added to the engine mount 10, as shown in FIG. 6. Namely, on the side of the lid member 26 opposite from the pressure receiving chamber 76, is formed the auxiliary fluid chamber 86 partially defined by a rubber elastic wall 85 and filled with the non-compressible fluid. The auxiliary fluid chamber 86 has a wall spring stiffness smaller than does the pressure-receiving chamber 76 and larger than does the equilibrium chamber 78, and a second orifice passage 88 is formed to permit a fluid communication between the pressure-receiving chamber 76 and the auxiliary fluid chamber 86. The second orifice passage is tuned to a higher frequency band than does the orifice passage 80. Thus, is provided an engine mount 90 constructed according to a second embodiment of the invention. In the engine mount 90, the two orifice passages 80, 88 may be tuned differently. For instance, the orifice passage 80 may be tuned to exhibit high damping effect on the basis of resonance of the fluid flowing therethrough, with respect to low frequency vibrations including engine shakes. On the other hand, the second orifice passage 88 may be tuned to exhibit excellent vibration isolating effect due to low spring constant of the mount with the help of resonance of the fluid flowing therethrough with respect to medium or high frequency vibration including engine idling vibration. Thus, the engine mount 90 can exhibit high damping effect with respect to vibrations over a wide frequency range.

Figure 7:
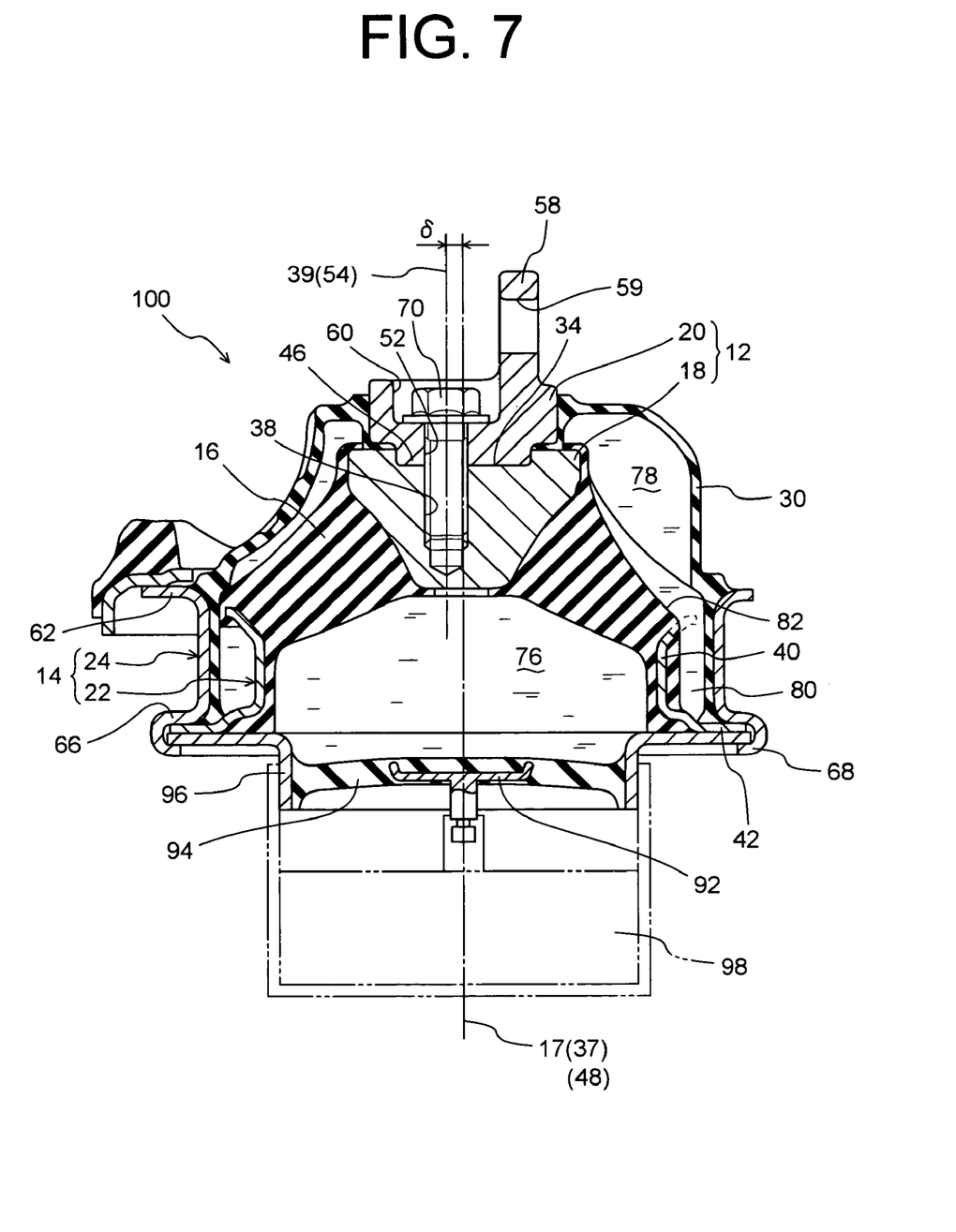
FIG. 7 is a vertical cross sectional view of a fluid filled vibration damping device in the form of an engine mount for use in an automotive vehicle, which is constructed according to a third embodiment of the present invention, and corresponding to the view of FIG. 1.

Alternatively, an active vibration damping mechanism may be added to the engine mount 10, as shown in FIG. 7. Namely, instead of the lid member 26, an oscillating plate 92 of generally disk shape is disposed. The oscillating plate 92 is fixed at its peripheral end to an annular support member 94 via an annular plate-like support rubber 96. The annular support member 94 is fixed by caulking to the diaphragm-side outer sleeve member 24. On the axially lower side of the diaphragm-side outer sleeve member 24, there is disposed an actuator 98 of air pressure type, electromagnetic-type, or other various types, as indicated in two-dot chain line in FIG. 7. This actuator 98 is operable to oscillate the oscillating plate 92, thereby providing an engine mount 100 constructed according to a third embodiment of the invention. In this engine mount 100, the oscillating plate 92 is operated under control so as to be oscillated at a frequency and phase corresponding to those in an input vibration. This makes it possible to actively control fluid pressure variation in the pressure receiving chamber 76, thereby adjusting damping performance of the engine mount 100. Thus, the engine mount 100 can exhibit further enhanced damping performance with respect to vibrations ranging over a wide frequency band.

In the illustrated embodiment, the bolt head housing recess 60 is formed onto the diaphragm-side inner member 20 in order to prevent the head of the connecting bolt 70 from projecting out from the upper face of the diaphragm-side inner member 20, and functioning as an obstacle to other member fixing operations to the mounting plate portion 58. However, the bolt head housing recess 60 is not essential to practice the present invention.

While in the illustrated embodiment, the center axis of the fitting projection and recess is conform with the center axis of the elastic-body-side and diaphragm-side inner members, it is included in the present invention that the center axis of the fitting projection and recess is somewhat off-centered from the center of the elastic-body-side and diaphragm-side inner members.

It should be appreciated that the connecting bolt may be situated on the projection/recess fitting portion, or alternatively spaced away from the projection/recess fitting portion.

Additionally, while the engine mount for automotive vehicles has been described as one preferred embodiment of the invention, the principle of the present invention may be equally applicable to a body mount, a member mount or other mounts for automotive vehicles, or a variety of vibration damping devices for other than automotive vehicles.

What is claimed is:

1. A fluid filled vibration damping device for connecting two members in a vibration damping fashion, comprising:
   a first mounting member fixable to one of the two members;
   a second mounting member fixable to an other of the two members;
   an elastic body bonded at a central portion thereof to the first mounting member and at an outer circumferential portion to the second mounting member, for elastically connecting the first and second mounting members, said elastic body partially defining a pressure receiving chamber filled with a non-compressible fluid and undergoing fluid pressure variation upon application of vibrational load between the first and second mounting members;
   a flexible rubber layer disposed about and covering an outside of the elastic body opposite the pressure receiving chamber, in order to define therebetween an equilibrium chamber filled with the non-compressible fluid and partially defined by the flexible rubber layer so as to easily permits a volumetric change thereof; and
   an orifice passage for fluid communication between the pressure receiving chamber and the equilibrium chamber,
   wherein the first mounting member includes an elastic-body-side central member bonded to the central portion of the elastic body, and a rubber-layer-side central member bonded to a central portion of the flexible rubber layer, which are superposed on and fastened to each other by means of a connecting bolt,
   wherein a projection/recess fitting portion is provided at a central portion of an interface between the elastic-body-side central member and the rubber-layer-side central member;
   wherein the rubber-layer-side central member includes a mounting projection projecting outward on an opposite side from the interface so that the first mounting member is fixable to the one of the two members at the mounting projection, and the connecting bolt is situated off-centered from a center of the rubber-layer-side central member and the elastic-body-side central member by a predetermined distance, and
   wherein the projection/recess fitting portion is of non-circular configuration in transverse cross section so that a relative rotation between the elastic-body-side central member and the rubber-layer-side central member is prevented.

2. A fluid filled vibration damping device according to claim 1, wherein the mounting projection and the connecting bolt are off-centered in mutually opposite directions from the center of the rubber-layer-side central member and the elastic-body-side central member.

3. A fluid filled vibration-damping device according to claim 1, wherein the elastic-body-side central member and the rubber-layer-side central member are both made of aluminum alloy.

4. A fluid filled vibration-damping device according to claim 1, wherein the second mounting member includes an elastic-body-side outer circumferential member bonded to the outer circumferential portion of the elastic body, and a rubber-layer-side outer circumferential member bonded to an outer circumferential portion of the flexible rubber layer, which are superposed on and fixed to each other at respective abutting surfaces thereof, and the orifice passage is formed by utilizing the abutting surfaces of the elastic-body-side outer circumferential member and the rubber-layer-side outer circumferential member.

5. A fluid filled vibration damping device according to claim 1, wherein the projection/recess fitting portion is constituted by a fitting projection formed on one of the elastic-body-side central member and the rubber-layer-side central member, and a fining recess formed on an other one of the elastic-body-side central member and the rubber-layer-side central member, the fitting projection and recess being interlocked to each other so that the elastic-body-side central member and the rubber-layer-side central member are fitted and positioned to each other.

6. A fluid filled vibration damping device according to claim 5, wherein the fitting projection projects with a constant substantially circular shape in transverse cross section, and has an outer circumferential surface planized with a chord-like shape at one circumferential portion so as to provide an engaging inner circumferential surface, and the fitting recess is depressed with a constant cross sectional shape corresponding to that of the fitting projection so as to provide an engaging outer circumferential surface, the inner and outer circumferential surfaces being brought into engagement with each other to position the elastic-body-side central member and the rubber-layer-side central member to each other in a circumferential direction.

* * * * *